Dec. 18, 1951 L. E. JONES 2,579,148
MOUNTING FOR REARVIEW MIRROR REFLECTORS
Filed April 2, 1949
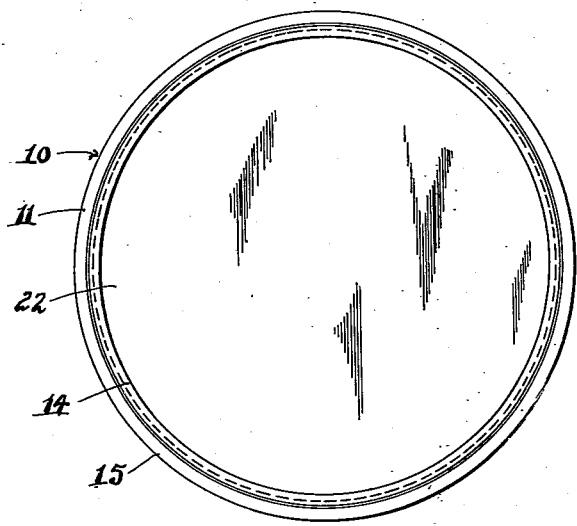
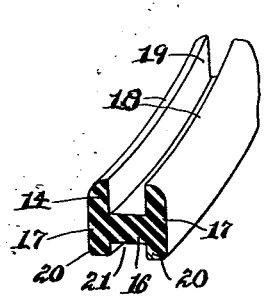
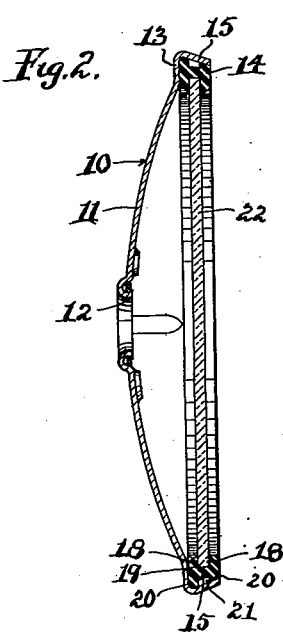
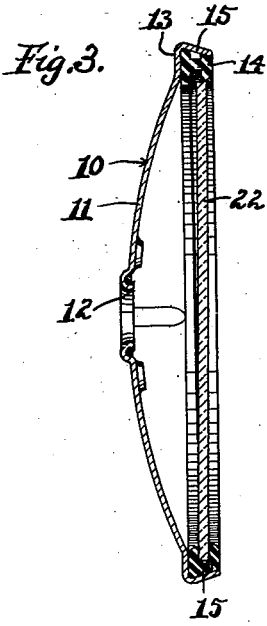
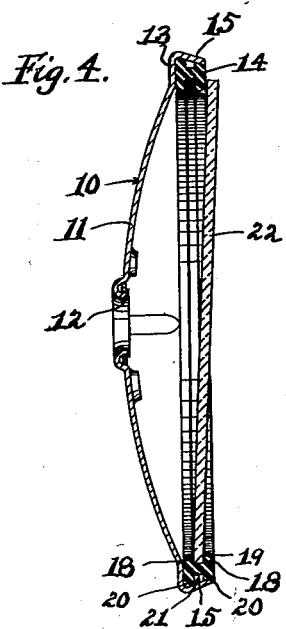
INVENTOR.
Livingston Eric Jones
BY
W. W. Williamson
Atty.

Patented Dec. 18, 1951

2,579,148

UNITED STATES PATENT OFFICE 2,579,148

MOUNTING FOR REARVIEW MIRROR REFLECTORS

Livingston Eric Jones, Philadelphia, Pa.

Application April 2, 1949, Serial No. 85,201

5 Claims. (Cl. 88—96)

My invention relates to a new and useful mounting for rear view mirror reflectors and has for one of its objects to provide an exceedingly simple and effective structure for holding the reflector or looking-glass in the metal back or shell of a rear view mirror head.

Another object of this invention is to provide an elastomeric-gasket of unique configuration for mounting a reflector or glass in a metal shell of a rear view mirror head to give high shock absorbing qualities to the assembly.

Another object of the present invention is to assemble the edge of a reflector element of glass in a compressible and resilient gasket mounted in a metal rear view mirror head whereby said reflector element, in effect, is floatingly fixed in said head.

A further object of the invention is to so arrange the several parts of a rear view mirror head that the reflector element or glass when broken or damaged may be readily and quickly replaced by a new one without the necessity of taking the head apart or discarding it for a completely new structure.

A still further object of the invention is to provide a new type of mounting for the reflector element of a rear view mirror head.

With the above and other objects in view this invention consists of the details of construction and combination of elements hereinafter set forth and then designated by the claims.

In order that those skilled in the art to which this invention appertains may understand how to make and use the same I will describe a construction in detail, referring by numerals to the accompanying drawing forming a part hereof, in which:

Fig. 1 is a front view of a rear view mirror.

Fig. 2 is a sectional view thereof on one of the diameters.

Fig. 3 is a similar view showing the reflector element or glass in a position assumed during the final steps of assembly.

Fig. 4 also is a similar view showing the reflector element or glass in a position assumed during initial steps of assembly.

Fig. 5 is an enlarged fragmentary perspective view of the gasket.

In carrying out my invention as herein embodied 10 represents a rear view mirror head including a generally saucer shaped shell or back 11, preferably constructed according to the details set forth in my co-pending application.

The shell or back is usually of metal fashioned to provide a central socket element or race 12 for the ball of a ball and socket joint between the head and a supporting post. The perimeter of said shell is formed to provide a flat outwardly projecting rim portion 13 in a plane at right angles to the axis of the shell and constitutes a seat for an elastomeric gasket 14, the latter being retained in place, under slight compression, by the inwardly canted annular flange 15 projecting from the outer circumference of the rim portion 13.

The elastomeric gasket 14 is composed of suitable elastic and compressible material, such as rubber, compositions of rubber, synthetic rubber or resilient plastics in order to be deformable to some extent.

This gasket 14 is generally H-shaped in cross section and includes a cross web 16, Fig. 5, joined to two parallel side walls 17 which project beyond said web in both directions to form inner toes 18 with a groove 19 between them and outer toes 20 with a groove 21 between the latter. The gasket, when in use, is a ring or annulus and the inner toes are at the inner circumference while the outer toes are at the outer circumference of said annulus.

The gasket, being of resilient, elastic and compressible material, when placed on the seat provided by the rim portion 13 and inside of the canted flange 15 will be slightly compressed and therefore normally retained against accidental displacement. Also because of the configuration of said gasket the toes will be somewhat flexible in a lateral direction relative to the whole gasket and the cross web 16 will have some flexibility radially of the gasket as a whole when considered as in its operative position.

The gasket is mounted with the outer toes 20 which, generally, are shorter than the inner toes 18, against the canted flange 15 thereby exposing the groove 19 located between the inner toes 18, the exterior surfaces of which are beveled at the edges.

The reflector element 22 is usually a round glass mirror or looking glass of smaller diameter than the space between any two diametrically opposite points of the edge of the canted flange 15 and of larger diameter than the interior of the gasket. In other words, the reflector element 22 is of a size to snugly fit within the annular groove 19 between the inner toes 18 without stretching the gasket. Thus the reflector element only engages soft compressible and resilient material and never contacts the hard shell structure so that said reflector element is thoroughly cushioned in all directions for greater shock resistance in case of striking some outside object or when the vehicle on which the rear view mirror is mounted, is traveling over rough roadways.

In mounting or assembling the reflector element, either originally or in the case of a replacement, said reflector element is tilted and an arc of its circumference inserted in a portion of the groove 19, as indicated in Fig. 4. Then the reflector element is forced radially outwardly with relation to the head or shell which will compress, spring outwardly and slightly deform the cross web 16 of the gasket, as suggested at the bottom of Fig. 3. This will move the diametrically opposite portion of the reflector element contiguous the inner circumference of the outside inner toe 18 permitting said reflector element to be forced inwardly by flexing said inner toe, as shown at the top of Fig. 3 until said reflector element finally passes beyond said inner toe at which time the counteraction of the sprung portion of the cross web will cause the reflector element to snap into place within the groove 19. In some instances it has been found that just prior to the reflector element clearing the outside inner toe said reflector element contacts the inside or companion inner toe and it can be compressed or flexed slightly to insure the necessary clearance.

Of course I do not wish to be limited to the exact details of construction herein shown and described as these may be varied within the scope of the appended claims without departing from the spirit of my invention.

Having described my invention what I claim as new and useful is:

1. A rear view mirror reflector or like frangible element mounting assembly comprising a frame of generally saucer shape having a substantially flat peripheral portion generally in the plane of the frame and an inwardly canted flange projecting from the outer circumference of said peripheral portion, an elastic, resilient and compressible gasket seated on the flat peripheral portion and being partially inside of and engaging said canted flange, said gasket having opposed circumferential grooves one of which faces the canted flange and the other being exposed, said other groove being flanked by pliable toes, and a frangible element of smaller circumference than the edge of the canted flange and larger than the inner circumference of the gasket and seated in the exposed groove of said gasket.

2. The structure according to claim 1 wherein the gasket is of elastomeric material.

3. The structure according to claim 1 wherein the gasket is of rubber.

4. The structure according to claim 1 wherein the gasket is of pliable, compressible elastic plastic.

5. A rear view mirror or like frangible element mounting assembly comprising a frame having a substantially flat peripheral portion generally in the plane of the frame and a gasket securing flange projecting inwardly at an angle from the outer circumference of said peripheral portion, an elastic, resilient and compressible gasket seated on the flat peripheral portion inside of the flange whereby said gasket is securely held in place, said gasket having opposed grooves one of which faces the flange and the other being exposed, and a frangible element seated in the exposed groove of the gasket, the peripheral dimension of the frangible element being smaller than that of the inner edge of the inturned flange and larger than the inner peripheral dimension of the gasket.

LIVINGSTON ERIC JONES.

REFERENCES CITED

The following references are of record in the file of this patent:

UNITED STATES PATENTS

| Number | Name | Date |
|---|---|---|
| 2,202,697 | La Hodny | May 28, 1940 |
| 2,208,642 | Neuwirth | July 23, 1940 |
| 2,498,065 | Budreck | Feb. 21, 1950 |